United States Patent
Bell et al.

(10) Patent No.: US 11,286,777 B2
(45) Date of Patent: Mar. 29, 2022

(54) REPAIRED RING AND METHOD FOR REPAIRING A RING WHICH IS USED FOR SEALING PURPOSES

(71) Applicant: Siemens Aktiengesellschaft, Munich (DE)

(72) Inventors: Ralf Bell, Mülheim an der Ruhr (DE); Anett Bergmann, Hattingen (DE); Christoph Bieniakonski, Essen (DE); Marius Busschulte, Voerde (DE); Stephan Ernst, Dinslaken (DE); Bora Kocdemir, Essen (DE); Markus Legenbauer, Essen (DE); Adam Maguire, Oberhausen (DE); Michael Oehmichen, Mülheim an der Ruhr (DE); Daniel Ostwald, Oberhausen (DE); Ulrich Stanka, Essen (DE); Andreas Ulma, Mülheim an der Ruhr (DE); Niclas van der Lest, Essen (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 35 days.

(21) Appl. No.: 16/617,616

(22) PCT Filed: Apr. 20, 2018

(86) PCT No.: PCT/EP2018/060139
§ 371 (c)(1),
(2) Date: Nov. 27, 2019

(87) PCT Pub. No.: WO2018/219555
PCT Pub. Date: Dec. 6, 2018

(65) Prior Publication Data
US 2020/0200010 A1    Jun. 25, 2020

(30) Foreign Application Priority Data

Jun. 2, 2017 (DE) ..................... 10 2017 209 364.1

(51) Int. Cl.
*F01D 5/00* (2006.01)
*F02C 7/28* (2006.01)
(Continued)

(52) U.S. Cl.
CPC ............... *F01D 5/005* (2013.01); *F02C 7/28* (2013.01); *F16J 15/0887* (2013.01); *B22F 10/20* (2021.01);
(Continued)

(58) Field of Classification Search
CPC   F16J 15/00; F16J 15/08; F16J 15/0806; F16J 15/0887; F01D 5/00; F01D 5/005;
(Continued)

(56) References Cited

U.S. PATENT DOCUMENTS 3,877,730 A     4/1975  Frantz
4,913,464 A  *  4/1990  Taylor ...................... B23P 6/00
                                              277/329

(Continued)

FOREIGN PATENT DOCUMENTS

DE   102011087207 A1   5/2013
EP       2246596 A2   11/2010

OTHER PUBLICATIONS

PCT International Search Report and Written Opinion of International Searching Authority dated Aug. 10, 2018 corresponding to PCT International Application No. PCT/EP2018/060139 filed Apr. 20, 2018.

*Primary Examiner* — Nathan Cumar
(74) *Attorney, Agent, or Firm* — Schmeiser, Olsen & Watts LLP

(57) ABSTRACT

By applying material on only one side in the case of a revision, seal rings can be easily rebuilt and reused.

10 Claims, 2 Drawing Sheets

(51) Int. Cl.
*F16J 15/08* (2006.01)
*B23K 26/342* (2014.01)
*B23K 101/00* (2006.01)
*B23P 6/00* (2006.01)
*F01D 11/00* (2006.01)
*B22F 10/20* (2021.01)

(52) U.S. Cl.
CPC ...... *B23K 26/342* (2015.10); *B23K 2101/001* (2018.08); *B23P 6/002* (2013.01); *F01D 11/005* (2013.01); *F05D 2220/31* (2013.01); *F05D 2230/80* (2013.01); *F05D 2240/55* (2013.01)

(58) Field of Classification Search
CPC ...... F01D 11/00; F01D 11/005; F01D 11/006; F01D 11/008; F05D 2220/00; F05D 2220/31; F05D 2220/32; F05D 2220/321; F05D 2220/3213; F05D 2220/3215; F05D 2220/3216; F05D 2220/3217; F05D 2220/3218; F05D 2220/3219; F05D 2230/00; F05D 2230/80; F05D 2240/00; F05D 2240/55; F02C 7/00; F02C 7/28
USPC ........................................................ 277/590
See application file for complete search history.

(56) References Cited

U.S. PATENT DOCUMENTS

| | | | | |
|---|---|---|---|---|
| 4,924,581 | A * | 5/1990 | Jakobsen | B23P 6/005 29/402.02 |
| 8,408,557 | B2 * | 4/2013 | Taylor | B23P 6/002 277/626 |
| 9,151,391 | B2 * | 10/2015 | Kern-Trautmann | B23P 6/00 |
| 2004/0123445 | A1 | 7/2004 | Esaki et al. | |
| 2010/0011774 | A1 | 1/2010 | Johnson et al. | |
| 2010/0276895 | A1 | 11/2010 | Taylor et al. | |
| 2014/0333032 | A1 | 11/2014 | Andreas et al. | |
| 2016/0067825 | A1 | 3/2016 | Vertenten et al. | |

* cited by examiner

REPAIRED RING AND METHOD FOR REPAIRING A RING WHICH IS USED FOR SEALING PURPOSES

CROSS-REFERENCE TO RELATED APPLICATIONS

This application claims priority to PCT Application No. PCT/EP2018/060139, having a filing date of Apr. 20, 2018, which is based off of DE Application No. 10 2017 209 364.1, having a filing date of Jun. 2, 2017, the entire contents both of which are hereby incorporated by reference.

FIELD OF TECHNOLOGY

The following relates to a repaired ring and to a method for repairing such rings that are used for sealing, in particular in steam turbines for sealing a steam chamber with respect to the surroundings or steam chambers with different pressures.

BACKGROUND

SLM-compatible design/redesign of steam turbine parts.

Nowadays, U-, I- and L-rings are manufactured conventionally or by means of SLM and have long delivery times. They are used in various components (e.g. valves, H-turbines) for sealing the steam chamber with respect to the surroundings or steam chambers with different pressures.

The intention is to solve the following problems by means of embodiments of the invention:
a) Delivery times are longer than the maintenance intervals. The rings thus must be prematurely procured independently of diagnosed requirements.
b) The rings have an oversize that is individually adapted during the maintenance interval.
c) The old rings are disposed of.
d) Expenditure on transport in the case of large rings (e.g. 2 m diameter).
e) High procurement and manufacturing costs of the forged parts.

Nowadays, only forged parts having long procurement times are used. The suppliers must be qualified. For maintenance operations, the rings must be procured in advance with an oversize. For the large rings, special processing machines are required.

SUMMARY

An aspect relates to a repaired ring for sealing, in particular an I-, L- or U-ring, having opposite contact surfaces, wherein the repaired ring was previously in use as new ring and material was removed by means of processing the contact surfaces, and in which a thickening is present on only one contact surface after the material removal.

BRIEF DESCRIPTION

Some of the embodiments will be described in detail, with reference to the following figures, wherein like designations denote like members, wherein.

The figures and the description present merely exemplary embodiments of the invention.

DETAILED DESCRIPTION

Figure 1:
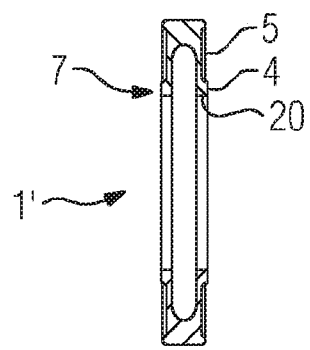
FIG. 1 shows a cross-sectional view of a sealing ring, in accordance with embodiments of the present invention.
Figure 2:
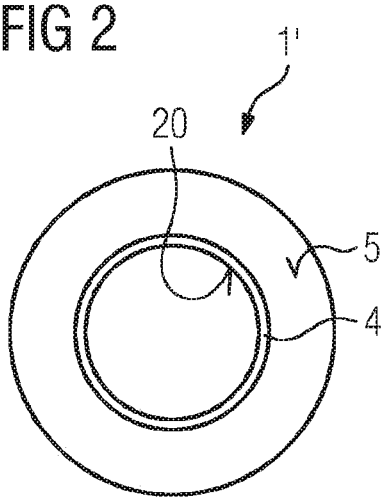
FIG. 2 shows a front view of the sealing ring of FIG. 1, in accordance with embodiments of the present invention.

FIGS. 1, 2 show a new sealing ring 1', in this case in a U-shape, but it may also have an I- or L-shape.

The new sealing ring 1' has, on both sides, contact surfaces 4, 7 that are formed on the inner edge 20 and are elevated from the surrounding surface 5.

During operation, wear occurs by means of friction, oxidation and/or erosion of the contact surfaces 4, 7 of the sealing ring 1', or on the opposite contact surfaces 4 and 7.

In the case of maintenance, these opposite contact surfaces 4, 7 are reworked, whereby the old ring 1' no longer has the sealing action and the ring cannot therefore be used further.

The sealing surface of the ring can be refurbished by means of a new repair concept. The contacting action of the sealing ring is thus restored.

Figure 4:
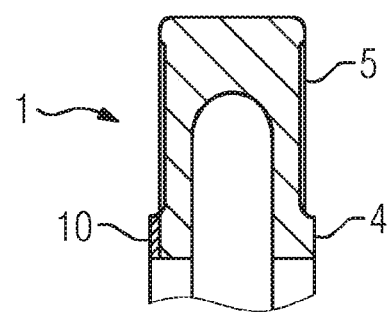
FIG. 4 shows an enlarged, cross-sectional view of another embodiment of the sealing ring, in accordance with embodiments of the present invention.

FIG. 4 shows, in cross section, such a ring 1, in this case having for example a U-shape.

According to embodiments of the invention, the contact surfaces 4, 7 have been processed, but material is applied only to one contact surface 7.

The application of the material may be performed by means of various application methods, such that a thickening 10 is performed.

These can be additive methods in which the ring is embedded in a powder bed and the region is built up step by step by means of selective laser sintering or laser melting or the sealing function is restored by means of build-up welding, in particular powder build-up welding.

The thickening 10 is performed by means of selective laser melting (SLM) or laser metal deposition (LMD) to give a near-net shape.

Figure 3:
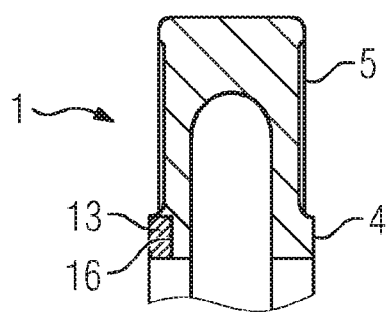
FIG. 3 shows an enlarged, cross-sectional view of a sealing ring, in accordance with embodiments of the present invention.

FIG. 3 shows another variant.

In the case of the ring 1, not only is worn material removed as per FIG. 4, but a groove 16 is intentionally created in which an insert ring 13 is inserted as thickening 10.

The insert ring 13 may be connected in the groove 16 in various ways: soldering, welding, mechanical clamping.

No new rings need to be procured or stocked. The old rings are treated only if this is diagnosed as being required.

The thickening 10 on only one side 7 compensates the removal on both sides 4, 7 or on the contact surface opposite the sealing ring surface.

Figure 5:
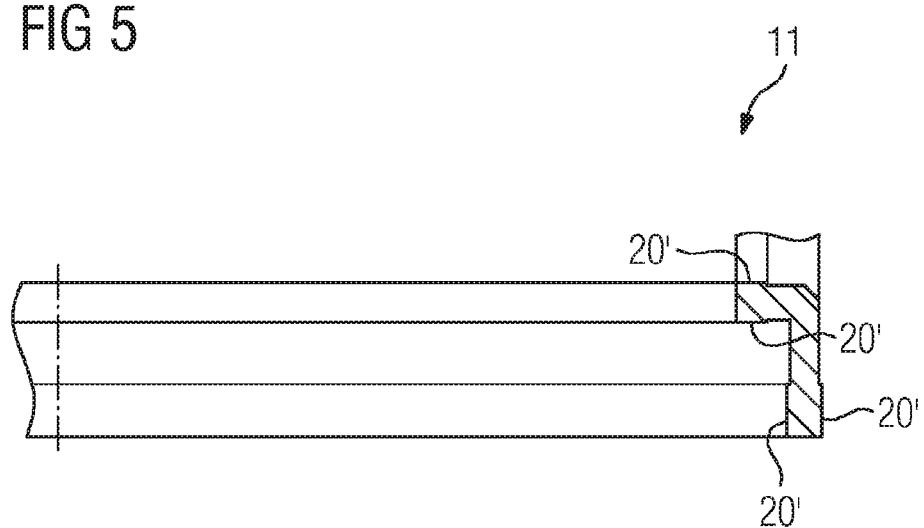
FIG. 5 shows an L-ring with contact surfaces, in accordance with embodiments of the present invention.
Figure 6:
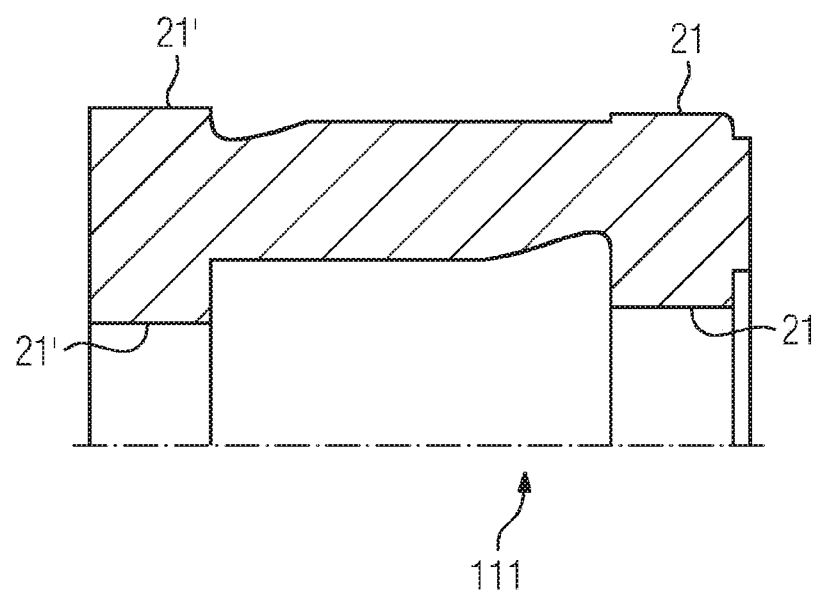
FIG. 6 shows an I-ring with contact surfaces, in accordance with embodiments of the present invention.

FIG. 5 shows an L-ring 11 with contact surfaces 20' and FIG. 6 shows an I-ring 111 with contact surfaces 21, 21'.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A repaired ring for sealing comprising:
opposite contact surfaces, wherein the repaired ring was previously in use as a new ring and a worn material resulting from operation of the repaired ring was removed by means of processing the opposite contact surfaces, and in which a thickening is present on only one of the opposite contact surfaces after the worn material is removed to compensate for a removal of the worn material from both the opposing contact surfaces.

2. The repaired ring as claimed in claim 1, in which a welded-on layer is present as thickening, wherein the repaired ring has another material and/or another microstructure in the thickening.

3. The repaired ring as claimed in claim 1, in which the thickening is performed by means of an insert ring in a depression.

4. The repaired ring as claimed in claim 1, in which the repaired ring is metallic.

5. The repaired ring as claimed in claim 1, in which the new ring constitutes a forged part.

6. A method for repairing a ring, comprising:
removing a worn material from a first contact surface and a second, opposing contact surface, the worn material resulting from operation of the ring; and
applying a material to only one of the first contact surface and the second, opposing contact surface to compensate for the removing of the worn material from both the first contact surface and the second, opposing contact surface.

7. The method as claimed in claim 6, in which a welded-on layer is present as thickening, wherein the repaired ring has another material and/or another microstructure in the thickening.

8. The method as claimed in claim 6, in which the thickening is performed by means of an insert ring in a depression.

9. The method as claimed in claim 6, in which the repaired ring is metallic.

10. The method as claimed in claim 6, in which an original ring constitutes a forged part.

* * * * *